United States Patent [19]
Wolf et al.

[11] Patent Number: 5,643,002
[45] Date of Patent: Jul. 1, 1997

[54] DEVICE FOR TRANSMITTING SIGNALS BETWEEN TWO TERMINALS

[75] Inventors: Klaus-Uwe Wolf, Erlangen; Friedrich Schauer, Heroldsberg, both of Germany

[73] Assignee: Alcatel Kabel AG & Co, Germany

[21] Appl. No.: 618,324

[22] Filed: Mar. 19, 1996

[30]  Foreign Application Priority Data

Mar. 30, 1995 [DE] Germany ............... 195 11 654.2

[51] Int. Cl.$^6$ ............................................. H01R 35/04
[52] U.S. Cl. ............................................. 439/164; 439/15
[58] Field of Search ........................... 439/164, 15

[56]  References Cited

U.S. PATENT DOCUMENTS

| | | | |
|---|---|---|---|
| 4,978,191 | 12/1990 | Hasegawa et al. | 439/164 |
| 5,066,239 | 11/1991 | Bannai et al. | 439/164 |
| 5,106,316 | 4/1992 | Bannai et al. | 439/164 |
| 5,219,460 | 6/1993 | Kato et al. | 439/164 |
| 5,224,871 | 7/1993 | Ida et al. | 439/15 |
| 5,277,604 | 1/1994 | Ida et al. | 439/164 |
| 5,409,389 | 4/1995 | Shibata et al. | 439/164 |

FOREIGN PATENT DOCUMENTS

| | | |
|---|---|---|
| 0417350 | 3/1991 | European Pat. Off. |
| 4211264 | 10/1992 | Germany |

*Primary Examiner*—Gary F. Paumen
*Attorney, Agent, or Firm*—Ware, Fressola, Van Der Sluys & Adolphson LLP

[57]  ABSTRACT

A device for transmitting signals between two terminals is indicated, of which at least one is moveable with respect to the other. The terminals are connected by at least one line (10) which is wound in turns and stored in an essentially circular cassette (K) comprising a rotor (15) and a stator (16). The turns of the line (10) are subdivided into an inner winding area and an outer winding area with different winding directions, between which an approximately U-shaped reversing area is located. A one-piece ring-shaped guide (14) is positioned between the two winding areas, and encompasses the reversing area of the turns. At least one of the peripheral faces of the guide (14) has a rib-like collar (18) that extends radially around the entire circumference, with a bottom face that rests against a corresponding surface of the rotor (15) when the collar is in its operating position.

7 Claims, 3 Drawing Sheets 5,643,002

DEVICE FOR TRANSMITTING SIGNALS BETWEEN TWO TERMINALS

BACKGROUND OF THE INVENTION

1. Technical Field

The invention refers to a device for transmitting signals between two terminals, at least one of which is moveable with respect to the other, and which are connected by at least one conducting line wound in turns. Other conducting lines can be connected between the two terminals. The line is stored in an essentially circular cassette comprising a stator that supports one of the terminals and a rotor that rotates around its axis and with respect to the stator and supports the other terminal. The turns of the line are subdivided into an inner winding area and an outer winding area with different winding directions, between which an approximately U-shaped reversing area is located. A ring-shaped guide encompasses the reversing area of the turns is located between the two winding areas and can move in the direction of the cassette. At least the inner periphery of the ring-shaped guide is configured to receive the turns of the inner winding area.

Such a device is needed, for example, to transmit a signal for releasing the impact-protection "airbag" in motor vehicles. It is located in the steering wheel of a motor vehicle to transmit an electrical or an optical signal. In the sense of the invention, the "line" can therefore be an electrical or an optical fiber line.

2. Description of the Prior Art

A significant problem for this device is the transmission of signals between fixed and moveable parts of a motor vehicle. The sliding contacts or rings, which have been known and used for a long time for transmitting current in such cases, are subject to wear and are disadvantageous, particularly because of the fluctuating transition resistances occurring at low power.

With the known device according to EP-OS 0 417 350, electric current is used to transmit the signals. The transmission of current takes place through a flat ribbon line or cable which is wound into a coil by a type of spring barrel and is stored in a cassette. With a relative rotating movement of the two terminals connected by the flat ribbon line, the coiled flat ribbon line "breathes" like the spring of a watch. In one direction of rotation, the turns of the coiled flat ribbon line are drawn together into a smaller diameter. They return to a larger diameter in the other direction. In this way the flat ribbon line is able to follow the turns of a steering wheel without any interruption of the signal path. To be able to perform a sufficient number of turns in both directions, a correspondingly long flat ribbon line is needed, which is stored in a large number of turns in the cassette. In principle, this device can be used in practice. However, because of the long length of the line and its relatively high ohmic resistance, difficulties can occur with the signals to be transmitted, especially at low power.

In the device according to the DE-OS 42 11 264, the length of the line between the two terminals is significantly shorter than in the device described in EP-OS 0 417 350. The coiled line is subdivided into inner and outer winding areas, in which the turns are wound in different directions. The two winding areas are interconnected by an approximately U-shaped reversing area. A ring-shaped guide is located between the two winding areas. It encompasses the reversing area and can move in the peripheral direction of the cassette. It is moved by the coiled line or by its reversing area when the rotor of the cassette is rotated. The guide comprises several rollers, which are offset from each other in the circumferential direction and can rotate around an axis, which are contacted by one turn each of the line from the inner winding area and the line from the outer winding area when the rotor is rotated. The rollers prevent the inner winding area turns from being applied too hard against the guide, which would jam it. The guide in this known device is especially expensive because of the separately located rollers.

SUMMARY OF THE INVENTION

It is an object of the invention to provide a device which is much simpler than the prior art. This object is fulfilled by the invention in that the guide is constructed in one piece and has a rib-like collar, at least on one of the peripheral faces extending radially around the entire circumference. In its operating position, the collar lies with its bottom face against a corresponding surface of the rotor.

Since the guide of this device is constructed in one piece, it is simple to build. It is preferably made of plastic and can be injection molded in a single operation. No additional parts need to be separately manufactured or mounted on the guide. The application of the collar against the corresponding surface of the rotor produces a loose, not slip-proof connection between the guide and the rotor. The strength of this connection is essentially determined by the weight of the guide itself, and by the condition of the respective rotor and collar surfaces. Therefore, when the rotor rotates, it pulls the guide along with some slippage due to the different speeds of the rotor and the guide. The extent of the slippage then also depends on the size and the condition of the touching rotor and collar surfaces. The rotating movement of the guide in the cassette is significantly aided by the rotor, so that the pressure to be exerted on the guide by the windings or by the reversing area of the line can be considerably reduced. This is especially noticeable when the diameter of the inner winding area of the line increases in the one direction of rotation. Because of its resulting smooth operation, the turn of the line contacting the guide can no longer press too tightly against it. The turns of the line remain rather loose in both directions of rotation of the rotor. The guide cannot be jammed for that reason.

The invention will be fully understood when reference is made to the following detailed description taken in conjunction with the accompanying drawings.

DETAILED DESCRIPTION OF THE INVENTION

The invention is described in the following for a device wherein a flat ribbon line with electrical conductors is located in the cassette. However, a line with at least one optical fiber can also be used instead. A combined line with electrical and optical fiber conductors could also be used. In principle, it is also possible to arrange two or more lines in the cassette. In lieu of all other possibilities, the following only describes one flat ribbon line with electrical conductors.

Figure 1:
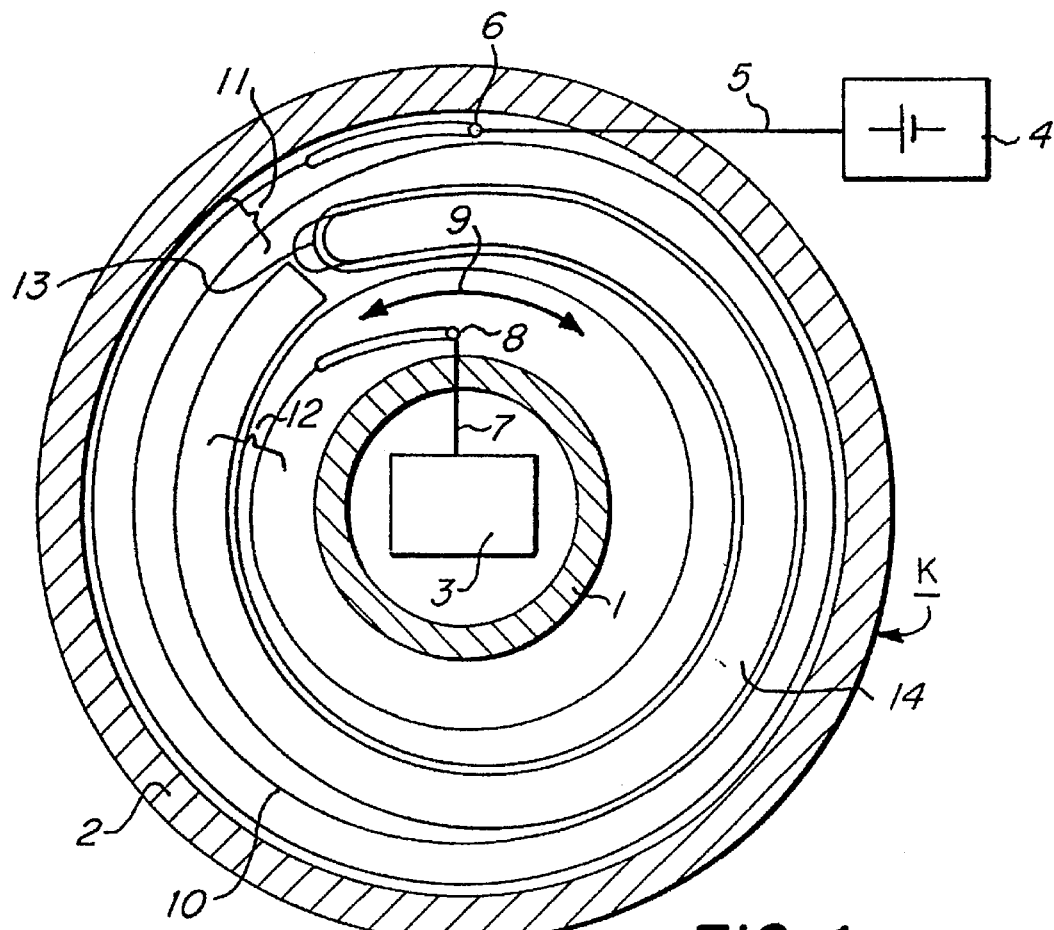
FIG. 1 is a schematic illustration of a device according to the invention.

FIG. 1 schematically illustrates two circular walls 1 and 2 of an essentially circular cassette K. It is intended to be installed in the steering wheel of a motor vehicle. In the illustrated configuration example, wall 1 belongs to the rotor of cassette K, while wall 2 is part of its stator. The cassette K is connected to the battery 4 of the motor vehicle, to supply power to the electronics 3, so that a signal from there can release an airbag. The battery 4 is connected by an electrical line 5 to a fixed point terminal 6 of cassette K. An electrical line 7 connects the electronics 3 to a terminal 8 of cassette K, which can move in the direction of the double arrow 9. Basically however, terminal 8 could be fixed and terminal 6 could be moveable. Both terminals 6 and 8 could be moveable as well.

A flat ribbon line 10 with at least two electrical conductors is located between the two terminals 6 and 8. The conductors are preferably flat conductors. This configuration of the flat ribbon line 10 is particularly thin and therefore occupies very little space. Basically, the flat ribbon line 10 could also have round conductors. The construction of the flat ribbon line 10 and its type of connection to the terminals 6 and 8 is not illustrated in great detail. They are basically known in different variations and are not significant in this instance.

According to FIG. 1, the flat ribbon line 10 in the cassette K is arranged in coils, which are subdivided into an outer winding area 11 and an inner winding area 12. The two winding areas 11 and 12 are identified by brackets. They each encompass two to three turns in the central or the mounted position of the cassette K shown in FIG. 1. The turns of the flat ribbon line 10 run in opposite winding directions in the two winding areas 11 and 12. The two winding areas 11 and 12 are connected with each other by an approximately U-shaped reversing area 13. A one-piece, ring-shaped guide 14 encompasses the reversing area 13 and is located between the two winding areas 11 and 12.

The guide 14 can move easily in the peripheral direction of cassette K, thus in the direction of double arrow 9. It can be configured as a closed ring with a passage for the reversing area 13 of the flat ribbon line 10. However, it can also be an open ring, which extends nearly 360°, as illustrated in FIG. 1. The guide 14 is preferably made of plastic. This makes it very light, so that it can move smoothly and nearly silently in the cassette K. A more precise configuration of the guide 14, which is only shown in principle in FIG. 1, can be seen in FIGS. 2 and 3.

Figure 2:
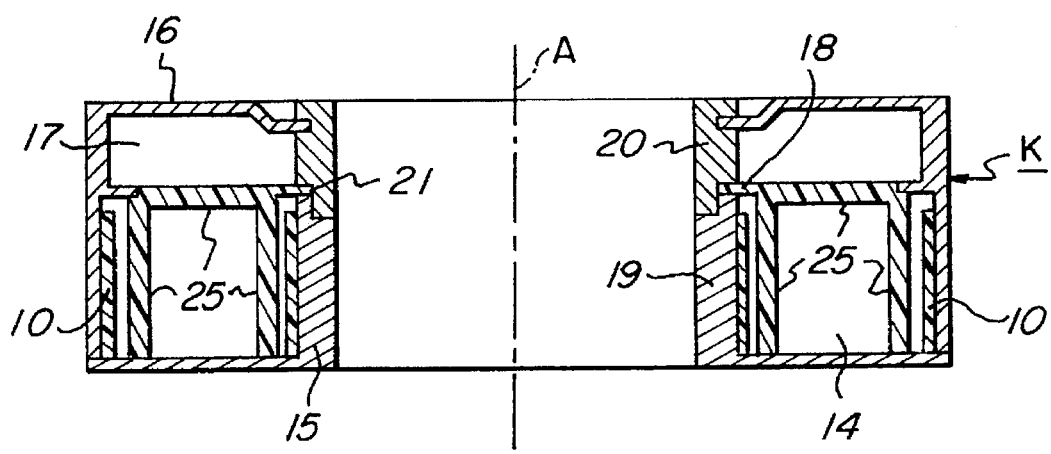
FIG. 2 is a cross section of the device according to FIG. 1, in greater detail.

The cassette K illustrated in FIG. 2 has a circular rotor 15 which can rotate around its axis A, as well as a circular stator 16, which is securely attached to the steering column of a motor vehicle. The rotor 15 and the stator 16 enclose an annular space 17 between them. The guide 14 and the wound flat ribbon line 10 are located in the annular space 17. For reasons of clarity of illustration, only one turn of the flat ribbon line 10 is shown on each side of the guide 14 in FIG. 2. Further details of the cassette K are not represented in FIGS. 2 and 3. They are fundamentally known and are not significant for the subject described herein.

In the configuration example illustrated in FIG. 2, the guide 14 is a hollow annular structure defined by a plurality of walls 25. The guide has a radially inward facing, rib-like collar 18 on the surface that faces upward when the guide is in its operating position. In a preferred configuration, the collar 18 is a rotatable disk. However, it could also contain several ribs 24 (FIG. 4), which are circumferentially offset with respect to each other in the same plane and are distributed along the entire periphery of the guide 14. With the appropriate configuration of rotor 15 and stator 16, the collar 18 could also be located on the outside of guide 14. In this sense, it is also possible to place a collar at any desired axial height of the guide, down to the bottom face in its operating position.

The rotor 15 has a hub 19 which concentrically surrounds the axis A at a distance, and comprises a projection 20 that extends it in the axial direction. It is securely connected to the hub 19 in the finished cassette K, for example by means of ultrasonic welding. The stator 16 meshes with the projection 20 in a kind of bearing arrangement. This bearing arrangement allows the rotor 15 in the stator 16 to rotate around axis A.

A gap 21 which is open in the direction of the annular space 17 is located between the hub 19 and the projection 20, and extends around the hub 19. In the operating position, the bottom face of the cassette K in gap 21 serves to support the collar 18 of guide 14. In the rotor 15, it is the corresponding surface for the collar 18. In the mounted condition, the collar 18 of guide 14 protrudes into the gap 21. Its bottom face then lies against the corresponding upward directed surface in gap 21. Other parts of the guide 14 do not touch the rotor 15. An open interstice 22 remains especially between the rotor 15 and the bottom face of guide 14. The collar 18 of guide 14 presses essentially by its own weight against the corresponding surface in the gap 21 of rotor 15. This application of the collar 18 to the rotor 15 is sufficient to turn the guide 14 as well, when the rotor 15 rotates.

Figure 3:
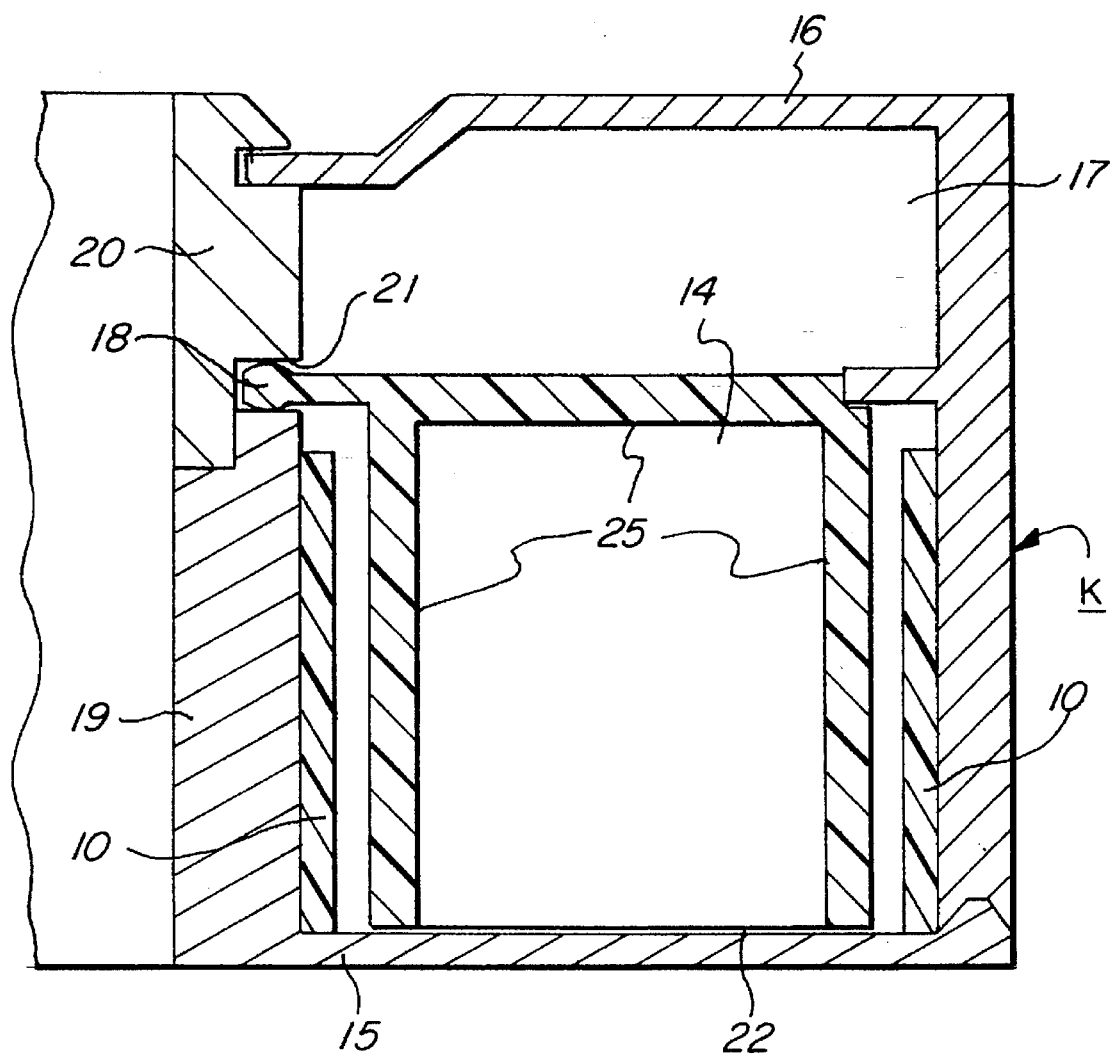
FIG. 3 is an enlarged detail of FIG. 2.

When the cassette K is mounted as illustrated in FIGS. 2 and 3, the guide 14 is inserted into the rotor 15 before the projection 20 is attached to the hub 19. The collar 18 of guide 14 is then arranged loosely and is therefore able to rotate inside the gap 21. It rests against the hub 19.

Figure 4:
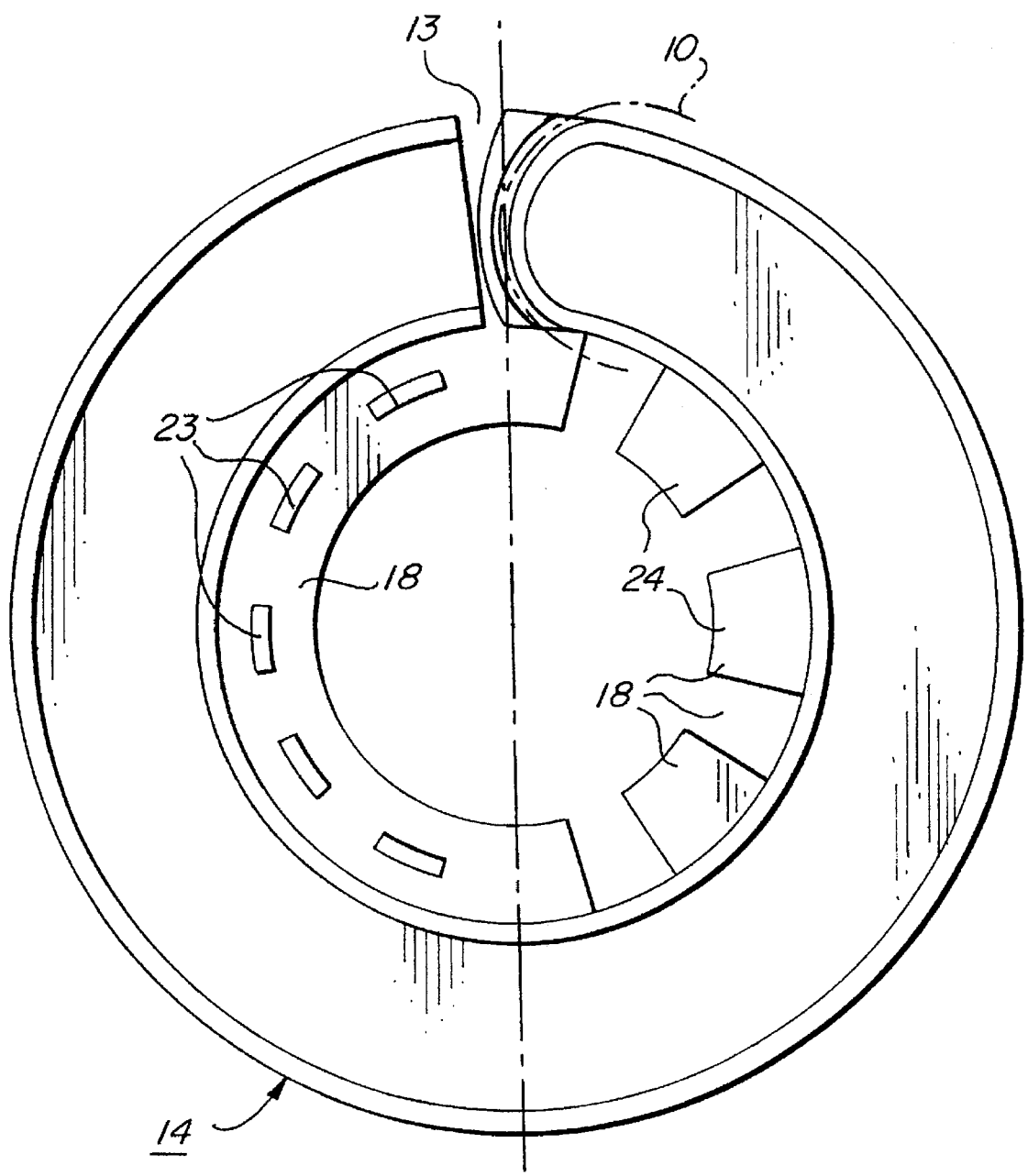
FIG. 4 is a bottom plan view which depicts details of two alternative guides used in the device.

If the collar 18 as well as the corresponding surface of the rotor 15 are configured circumferentially and without interruption, axially extending and peripherally offset protrusions 23 can be located on the bottom face of collar 18, as depicted on the left side of FIG. 4, which reduce the size of the contact surface between the two parts. However, as an alternative, it is also possible to place such protrusions on the corresponding face of the rotor 15.

If the collar 18 comprises circumferentially offset ribs 24 located in one plane as illustrated on the right side of FIG. 4, the corresponding surface in the gap 21 of rotor 15 must be configured for their passage. In these two configurations, the size of the contact surface between the collar 18 and rotor 15 is reduced as well.

The collar 18 can also be constructed in a resilient manner in all the possible configurations. This is particularly desirable when ribs 24 are used as the collar 18.

The preferred embodiment described above admirably achieves the objects of the invention. However, it will be appreciated that departures can be made by those skilled in the art without departing from the spirit and scope of the invention which is limited only by the following claims.

What is claimed is:

1. A device for transmitting signals between two terminals, the device comprising:
   (a) an essentially circular cassette comprising a stator which supports one of the terminals and a rotor which is able to rotate around its axis and with respect to the stator and which supports the other terminal;
   (b) at least one line stored in the cassette and being wound in turns, the at least one line being operationally connected between both terminals, the turns of the line are subdivided into an inner winding area and an outer winding area with different winding directions between which an approximately U-shaped reversing area is located; and (c) a one-piece ring-shaped guide located between the two winding areas and encompassing the reversing area of the turns, the ring-shaped guide mounted for rotation in the peripheral direction of the cassette and having at least its inner periphery adapted to receive the turns of the inner winding area, the ring-shaped guide having a full rib-like collar extending radially inwardly from an inner wall of the ring-shaped guide, the rib-like collar having a lower face which lies against a corresponding surface of the rotor.

2. A device as claimed in claim 1, wherein the collar is configured as a circumferential ring.

3. A device as claimed in claim 1, wherein the collar comprises several ribs which are offset with respect to each other in the circumferential direction of the guide and are located in one plane.

4. A device as claimed in claim 1, wherein the collar is located on an upper face of the guide.

5. A device as claimed in claim 1, wherein a lower face of the collar has protrusions which are offset with respect to each other in a circumferential direction.

6. A device as claimed in claim 1, wherein the corresponding face of the rotor has protrusions which are offset with respect to each other in the circumferential direction.

7. A device as claimed in claim 1, wherein the collar is constructed in a resilient manner.

* * * * *